United States Patent
Winget et al.

(10) Patent No.: US 8,334,247 B2
(45) Date of Patent: Dec. 18, 2012

(54) COMPOSITION WITH UV PROTECTANT FOR RESTORATION AND PRESERVATION OF PVC PRODUCTS

(76) Inventors: Richard Winget, Doylestown, PA (US); David Foulke, Southampton, PA (US); Patrick Byrne, Southampton, PA (US)

( * ) Notice: Subject to any disclaimer, the term of this patent is extended or adjusted under 35 U.S.C. 154(b) by 0 days.

(21) Appl. No.: 13/134,530

(22) Filed: Jun. 9, 2011

(65) Prior Publication Data

US 2011/0306535 A1   Dec. 15, 2011

Related U.S. Application Data

(60) Provisional application No. 61/353,296, filed on Jun. 10, 2010.

(51) Int. Cl.
*C11D 3/20* (2006.01)
*C11D 3/44* (2006.01)
*C11D 3/50* (2006.01)
*C11D 3/28* (2006.01)
*C11D 7/50* (2006.01)

(52) U.S. Cl. ........ 510/243; 510/101; 510/244; 510/463; 510/500; 510/505

(58) Field of Classification Search ............... 510/101, 510/243, 244, 463, 500, 505
See application file for complete search history.

(56) References Cited

U.S. PATENT DOCUMENTS

2003/0069146 A1 *   4/2003   Garmier ................. 508/491

* cited by examiner

*Primary Examiner* — Brian P Mruk
(74) *Attorney, Agent, or Firm* — Dan M. DeLaRosa

(57) ABSTRACT

A composition for restoration and treatment of PVC materials is provided and the composition comprises: at least one plant based solvent; and at least one UV protectant, and the plant based solvent comprises from about 20% to about 95% of said composition and the UV protectant is from about 1% to about 15% of said composition.

19 Claims, No Drawings

COMPOSITION WITH UV PROTECTANT FOR RESTORATION AND PRESERVATION OF PVC PRODUCTS

RELATED APPLICATION

This application is related to U.S. Application Ser. No. 61/353,296 filed on Jun. 10, 2010 entitled "BIO-BASED SOLVENT FOR TREATING WEATHERED POLYMERIC MATERIALS".

BACKGROUND OF THE INVENTION

1. Field of the Invention

The present invention relates to a formulation, composition and related methods for protecting and rejuvenating outdoor household PVC materials such as decking and siding and for cleaning and restoring other weathered polymeric surfaces. More specifically, it relates to the use of plant-based solvents and UV protectants to restore the color and appearance of PVC surfaces.

2. Description of the Related Art

A variety of outdoor household products such as siding, doors, fences and decks utilize vinyl resins such as polyvinyl chloride (PVC). Ultraviolet light however causes these materials to discolor and appear weathered due to this environmental exposure. These products are also susceptible to the buildup of mold, mildew, algae and staining. There exists a need for an environmentally friendly, plant-based solvent and UV protectant composition for cleaning and rejuvenating outdoor household PVC materials that is safe, effective, economical and requires a minimum amount of labor.

SUMMARY OF THE INVENTION

In one embodiment, the present invention provides for a formulation comprising: ethyl lactate; at least one hydrocarbon solvent; and at least one benzotriazole UV protectant wherein the formulation is applied to a polymeric material for restoration of color and appearance.

In another embodiment, the formulation further comprises D-limonene. In a further embodiment, the D-limonene is from about 1% to about 10% of said formulation. In another further embodiment, the D-limonene functions as a cleaning and odor removing agent.

In yet another embodiment, ethyl lactate is from about 20% to about 95% of said formulation. In still another embodiment, the hydrocarbon solvent is from about 1% to about 10% of said formulation. In still yet another embodiment, the UV blocker is from about 1% to about 15% of said formulation.

In a further embodiment, the formulation may be applied a fiberglass gelcoats. In yet a further embodiment, ethyl lactate and the hydrocarbon solvent softens a surface of the polymeric material and the UV protectant chemically or mechanically bonds to the polymeric material to restore color and appearance.

In still a further embodiment, the present invention relates to a polymeric material color restoration composition comprising: at least one plant based solvent; and at least one UV protectant. In still yet a further embodiment, the plant based solvent comprises ethyl lactate from about 20% to about 95% of the composition. For purposes of this invention, the term "plant based solvent" shall be defined as any solvent that is derived or can be derived from plants including synthetically manufactured solvents.

In another embodiment, the UV protectant is from about 1% to about 15% of the composition. For purposes of this invention, the term "UV Protectant" shall be defined as any additive incorporated into the mixture that will provide protection from UV degradation of the surface, including, but not limited to, benzotriazoles, metal oxides and other related chemical and mixtures thereof, and may perform as free radical scavengers, filters blockers or other various methods of UV protection.

In still another embodiment, the composition further comprises at least one hydrocarbon solvent from about 1% to about 10% of the composition. For purposes of this invention, the term "hydrocarbon solvent" shall be defined as any chemical or mixture of chemicals whose molecules are primarily carbon and hydrogen that may function as a solvent and/or that has properties that can soften or dissolve materials within that material's solubility parameter.

In still yet another embodiment, the composition further comprises at least one cleaning and odor removing agent. In a further embodiment, the cleaning and odor removing agent is from about 1% to about 10% of the composition. For purposes of this invention, the term "cleaning and odor removing agent" shall be defined as any chemical or substance that clean or remove odor.

In another further embodiment, the plant based solvent is selected from a group consisting essentially of plant based esters and hydrocarbons, esters, hydrocarbons and mixtures thereof. In yet another further embodiment, the hydrocarbon solvent is selected from a group consisting essentially of long chain hydrocarbons. In still another further embodiment, the UV protectant is selected from a group consisting essentially of benzotriazoles, metal oxides and mixtures thereof.

In still yet another further embodiment, the cleaning and odor removing agent is selected from a group consisting essentially of terpines, plant based terpines and mixtures thereof.

In another embodiment, the present invention provides for a method of manufacturing polymeric material color restoration composition comprising admixing at least one plant based solvent and at least one UV protectant.

In order to fulfill the need for a more eco-friendly cleaning and restorative solution for outdoor structures which contain PVC, the present invention has been created. The invention utilizes plant-based solvents to modify the PVC surface giving the appearance of color restoration. In addition, the invention utilizes UV absorbers and HALS (hindered amine light stabilizers) to extend the color retention of the surface. The UV absorbers prevent the degradation of both coatings and substrates by filtering out harmful UV energy of sunlight. The HALS stabilizers act as radical scavengers and inhibit the photo-oxidative breakdown reactions. Both of these effective ingredients work together synergistically to provide enhanced protection and prolonged coating durability. In addition to the invention's utility as a restorative and rejuvenating composition, it also displays cleaning properties and can be used to remove scuff marks, rust, oil stains and other stains on the above-mentioned polymeric surfaces.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment of the invention, a liquid composition utilizes ethyl lactate as its primary active ingredient. It may also use up to 9-10% of a traditional hydrocarbon solvent. Ethyl lactate is the primary active ingredient for the cleaning properties of the invention which also utilizes d-limonene as a lesser active ingredient to aid its cleaning properties. In one embodiment, the formulation of the invention comprises a concentration of 94-5% by volume of a material sold under the name of Bio-Solv™ sold by MAS Epoxies located at 2615 River Road, Cinnaminson, N.J. This product contains 91% ethyl lactate and a solvent containing ethyl-3 at 8% and BHT at 1% concentration. In addition to the Bio-Solv™ ingredient, d-limonene in the amount of 6% is included. An enhanced version of the invention utilizes an organic UV inhibitor in the range of .25% to 5%. An example is Tinuvine 5151 produced by CIBA Specialty Chemicals at a concentration of 1.66%, with the other ingredients reduced proportionately. Other ingredients that have been tested include soy methyl ester as well as other plant-based solvents. The inclusion of a UV inhibitor/blocker with a PVC restorative solvent is thought to be a unique aspect of the invention. The UV inhibitors combine with the dissolved PVC surface to retain the inhibitor within the dissolved host material. This chemical action has been found to greatly extend the UV inhibiting life of the treatment compared to prior art products.

The composition of the invention is used to clean and restore color to weathered or aged surfaces, primarily PVC cap stock, acrylic cap stock, ASA cap stock, fiberglass and other polymeric surfaces. These surfaces typically include household materials such as decks, siding, deck railing, piping and marine surfaces. The invention has been found effective in restoring the color and removing stains from these plastic surfaces. The liquid composition of the invention is employed very simply by direct topical application using a 100% cotton cloth or mop. It can also be sprayed on with spray apparatus well known in the art. The invention provides a one-step cleaning and conditioning of conditioning of surfaces and materials containing PVC while restoring and beatifying their original color. The present invention works by a chemical re-extrusion of the PVC surface by melting microcrazing cracks together. This process changes the way light is reflected and refracted from the surface, giving the appearance of restoring the original color. The bio-based solvents soften the PVC surface and allow the UV inhibitor/blocker to chemically bond to the PVC therefore extending the life of the "color" of the PVC. In one embodiment, the hydrocarbon solvent is butylated toluene.

The present invention as demonstrated by the composition of one embodiment described above and has been found to extend the life of the PVC surface color, providing a cleaning and restorative result in a one-step simple application. The inventive composition provides advantages over the prior art because it utilizes plant-based, non-hazardous, non-flammable constituents. It is shown to be highly effective in restoring color to faded, aged or weathered surfaces while cleaning stains. Incorporation of the UV absorbers and HALS can extend the life of the color by greater than 50%. The present compound is also found to be effective in restoring fiberglass gel coats.

Therefore, the foregoing is considered as illustrative only of the principles of the invention. Further, since numerous modifications and changes will readily occur to those skilled in the art, it is not desired to limit the invention to the exact composition and operation shown and described, and accordingly, all suitable modifications and equivalents may be resorted to, falling within the scope of the invention.

What is claimed is:

1. A formulation comprising: ethyl lactate; at least one hydrocarbon solvent; D-limonene; and at least one benzotriazole UV protectant wherein said formulation is applied to a polymeric material for restoration of color and appearance.

2. The formulation of claim 1 wherein said ethyl lactate is from about 20% to about 95% of said formulation.

3. The formulation of claim 1 wherein said hydrocarbon solvent is from about 1% to about 10% of said formulation.

4. The formulation of claim 1 wherein said UV protectant is from about 1% to about 15% of said formulation.

5. The formulation of claim 1 wherein said formulation may be applied a fiberglass gelcoats.

6. The formulation of claim 1 wherein said ethyl lactate and said hydrocarbon solvent softens a surface of said polymeric material and said UV protectant bonds to said polymeric material to restore color and appearance.

7. The formulation of claim 1 wherein said D-limonene is from about 1% to about 10% of said formulation.

8. The formulation of claim 1 wherein said D-limonene functions as a cleaning and odor removing agent.

9. A polymeric material color restoration composition comprising:
at least one plant based solvent; at least one hydrocarbon solvent; ethyl lactate; D-limonene; and at least one UV protectant.

10. The composition of claim 9 wherein said plant based solvent comprises from about 20% to about 95% of said composition.

11. The composition of claim 9 wherein said UV protectant is from about 1% to about 15% of said composition.

12. The composition of claim 9 wherein said hydrocarbon solvent comprises from about 1% to about 10% of said composition.

13. The composition of claim 9 further comprises at least one cleaning and odor removing agent.

14. The composition of claim 13 wherein said cleaning and odor removing agent is from about 1% to about 10% of said composition.

15. The composition of claim 9 wherein said plant based solvent is selected from a group consisting of plant based esters and hydrocarbons, esters, hydrocarbons and mixtures thereof.

16. The composition of claim 9 wherein said hydrocarbon solvent is selected from a group consisting of long chain hydrocarbons.

17. The composition of claim 9 wherein said UV protectant is selected from a group consisting of benzotriazoles, metal oxides and mixtures thereof.

18. The composition of claim 13 wherein said cleaning and odor removing agent is selected from a group consisting of terpenes, plant based terpenes and mixtures thereof.

19. A method of manufacturing polymeric material color restoration composition comprising admixing ethyl lactate; at least one hydrocarbon solvent; D-limonene; and at least one UV protectant.

* * * * *